Nov. 26, 1940.  G. W. PIRK  2,222,639
ELECTRICAL CONDUCTOR
Filed Aug. 2, 1940
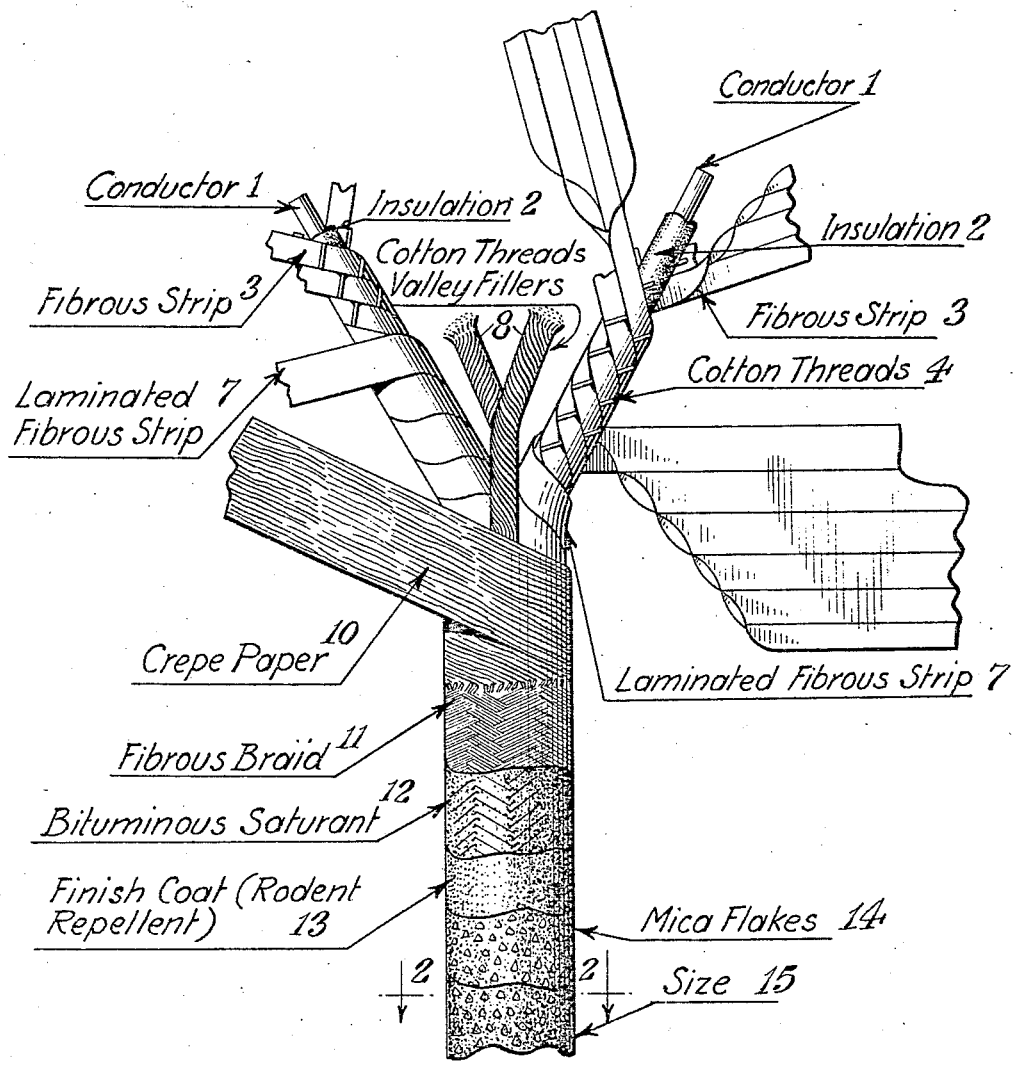
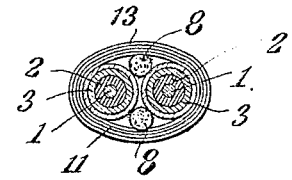
INVENTOR
Gustav W. Pirk
BY
George J. Dekotter
ATTORNEY

UNITED STATES PATENT OFFICE 2,222,639

ELECTRICAL CONDUCTOR

Gustav W. Pirk, Rome, N. Y., assignor to General Cable Corporation, New York, N. Y., a corporation of New Jersey Application August 2, 1940, Serial No. 349,540

13 Claims. (Cl. 174—121)

This invention relates to improvements in insulated electrical conductors or cables having non-metallic sheaths and is designed to minimize or eliminate the danger of damage to the insulating and protective coverings of such conductors or cables by rats, mice, squirrels or other rodents, or, in fact, by any form of animal or insect life which is subject to control by the specified construction. The invention also relates to rodent repellent materials for general uses.

In the co-pending application of Julius A. Szilard, Serial No. 163,197, filed Sept. 10, 1937, there is disclosed a cable construction which embodies an effective rodent repellent instead of the toxic substances which were relied upon previously to prevent damage to cable coverings. The repellent material is one which is non-palatable to rodents, this term including both objectionable taste and objectionable odor or smell characteristics. One method therein proposed for incorporating the rodent repellent material was to blend it in the pitch coating of the cable. Several specific rodent repellent materials also were disclosed therein.

According to the present invention, certain other effective rodent repellent materials and certain other methods of incorporating these materials in cables will be disclosed.

The particular materials which were emphasized in the prior application were those which were principally objectionable to taste, being of a bitter or acrid type, and which were stable and less noticeable by their odor or smell. They were preferably incorporated at the outer surface of the cable where they would be tasted as soon as the cable was attacked. It was assumed, and correctly as proved by tests, that rodents attacked cables in many cases to reach food to which the cable formed a barrier. But I have found that rodents also attack cables frequently merely because the cables happen to be located in their accustomed runs or even in places where they seek to establish new runs. Consequently, materials in which smell is somewhat more dominant may prove even more effective than materials in which the taste is more dominant.

However, since smell in its nature requires some evaporation of the substance into the air it is necessary to use a material which will give off a strong smell for a long time with minimum evaporation. It is also desirable to incorporate such materials in the cable at a low temperature in order to avoid initial loss of effectiveness during manufacture. Hence instead of incorporating the repellent material in a hot pitch coating as was done under one method proposed in the application, I find it preferable with the materials which I use to incorporate them in a paint or saturant which may be made and applied cold, i. e., at room temperature, corresponding to the temperature at which the cable will be used. Incidentally this avoids smells which might be objectionable to operators during manufacture of the cables.

When the smell characteristics are more dominant, the material preferably is placed further beneath the surface of the cable in order to preserve it for a long period of time. Even so, the odor continually reaches the surface in sufficient strength to effectively discourage gnawing of the outer covering for the life of the cable.

The materials which I have found to be very effective are those which have a taste which is pungent, burning, irritating, astringent, or nauseating in nature, or a smell which is aromatic, ethereal, or pungent. One example of the first group in which taste is more dominant is maleic acid, which has a characteristic vile, repulsive and astringent taste and a faint acidulous odor.

One example of the second group in which smell is more dominant is oil of tansy which has a characteristic aromatic and ethereal odor and a peculiarly bitter taste. In each group the materials have pronounced taste and smell characteristics, although, as stated, the taste is more dominant in some and the smell is more dominant in others. Preferably, materials from the two groups are combined to obtain the effect of the dominant characteristics of each. For example, maleic acid and oil of tansy may be blended in a saturant or paint which is prepared and applied cold. In all of the materials disclosed herein the smell is sufficiently dominant to discourage attack on the cables.

Merely by way of illustrative example, and without restricting the invention in any way, one form of cable construction with which the present invention may be embodied, is shown in the accompanying drawing, wherein:

Fig. 1 is a plan view of a short length of two conductor cable having the layers of material overlying the conductors cut back progressively greater distances to show the interior construction; and Fig. 2 is a transverse section through the cable substantially on the line 2—2 of Fig. 1.

The cable illustrated in the drawing comprises conductors 1; each having a covering of insulating compound 2 such as rubber; a protective sheath of fibrous strips 3 braided with cotton threads 4, this sheath being treated with a compound to render it moisture or flame resistant, or both, if desired; a second protective sheath of laminated fibrous strips 7; cords 8 filling the valleys between the covered conductors; a helically or longitudinally wrapped binding layer or dam of crepe paper 10; and a strong outer fabric braid 11. The outer fabric braid may be treated with a flameproof and substantially moistureproof penetrating saturant such as a bituminous compound, for example, stearin pitch. This is indicated by the numeral 12. A finishing coat 13 of a bituminous compound such as stearin pitch, a coating 14 of mica flakes and a thin coating 15 of size, may constitute the finish of the cable outside the fabric braid 11.

The rodent repellent materials, in common with those of the previous application, and as distinguished from the toxic substances of the prior art which require partial consumption of the cable covering for their effect, have the following characteristics:

1. They are very stable;
2. They have no odor which is objectionable to humans;
3. They are non-toxic to humans;
4. They are non-toxic to rodents, acting as repellents because of their unpalatable characteristics (taste or smell or both), rather than as poisons.

In the aforementioned application of Szilard the repellent material was preferably admixed with the pitch finish, and mica. In the present application the repellent material is used in paints, lacquers and paraffin coats or penetrants on the exterior of the cable, or preferably as solutions or emulsions applied on the inside constructional members of the cable.

When the repellents are incorporated in the inner members of the cable they are retained better because they are sealed in by braid and other outer coverings of the cable. The new repellent materials disclosed herein will, however, be useful, and for shorter periods will be more effective, if mixed directly with the mica, or in a pitch paint, or in the regular pitch finish, as described in the Szilard application.

Some of the materials in which taste is more pronounced, but which still have sufficient smell to be noticeable and discourage attacks of rodents are those which are pungent, burning, irritating, astringent or nauseating in nature. Examples of this group are maleic acid, alpha-naphthol, basic copper carbonate and copper sulphate. The first two, maleic acid and alpha-naphthol, have given better results so far than the others.

Maleic acid has the following formula:

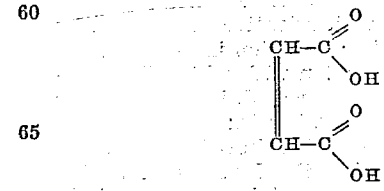

Alpha-naphthol has the following formula:

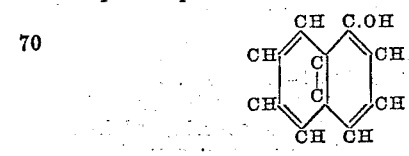

Some of the materials in which smell is more pronounced, but which still have sufficient taste to be effective upon that characteristic alone, are those which have an aromatic, ethereal or pungent odor. Examples of this second group are the essential or aromatic oils containing the thujone component, i. e., thujyl alcohol, its isomers, or its derivatives, or any combination of these. Among the materials containing the thujone component are oil of tansy, imitation or synthetic oil of tansy, oil of thuja and oil of wormwood. Thujone has the following formula:

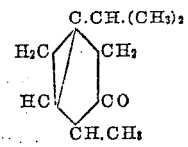

Maleic acid may be applied externally as an aqueous solution with a starch sizing. It may be incorporated directly by mixing up to 2% or more with the mica flakes on the outside. It may also be applied as a penetrating material such as a paint or saturant, dissolved in a mixture of alcohol and textile spirits.

One formula for making such a saturant or paint suitable for use in the valley fillers or cords 8, in the paper wrap or dam 10, or in the fibrous braid 11 of the cable illustrated, may be as follows:

| | Pounds |
|---|---|
| Maleic acid | 0.5 |
| Alpha-naphthol | 0.5 |
| Alcohol (denatured) | 6.0 |
| Textile spirits | 1.0 |

This material is mixed cold and applied cold to avoid loss in effectiveness. When incorporated into the internal members of the cable construction it has been found that the outer braid or other covering acts as a seal to hold in and retain the more volatile constituents of the rodent repellent. At the same time the odor escapes in sufficient amount to ward off attacks by rodents.

Either maleic acid or alpha-naphthol may be used alone in the above composition, the other being simply omitted without change in amount of the one retained, or by using as much of the one retained as prescribed here for both together. Other amounts may also be used, the composition given being merely exemplary.

One size which applicant has used contained 15% maleic acid. Maleic acid has been incorporated by applicant in a lacquer finish. It has been applied also in a pitch paint.

Alpho-naphthol has been added by applicant in a paraffin wax finish in solution in alcohol plus textile spirits. It has also been incorporated in other solvents such as benzol and carbon tetrachloride.

Alpha-naphthol has also been incorporated by applicant into the folded paper, the valley filler or rip cord, the braid, the paper dam, and in the external mica and size finish. For example, 5% of alpha-naphthol was mixed directly with the mica flakes and 10% was incorporated in the size finish.

Copper carbonate and copper sulphate, both of which are astringent, have been applied as pigment suspended in lacquer, the lacquer being applied as an external finish. As an example for the application of copper carbonate or copper sulphate the following is the formula of a lacquer that has been used successfully by applicant as a rodent repellent coating for non-metallic sheathed cable:

|  | Grams |
|---|---|
| Chlorinated rubber (10-20 centipoise) | 400 |
| Tricresylphosphate | 200 |
| Copper carbonate (or sulphate) | 400 |
| Carbon tetrachloride | 3200 |

Oil of tansy has been applied by applicant in the form of an emulsion, as a solution in a suitable solvent, in lacquers, and in a pitch paint. As an example, the crinkled paper dam may be saturated with a 1.5% solution of oil of tansy in textile spirits.

As another example, one or more substances from each group may be combined in a cold-prepared and cold-applied pitch paint of the following composition:

| Hard stearin pitch | grams | 12 |
|---|---|---|
| Blanc fixe | do | 9 |
| Maleic acid | do | 10 |
| Textile spirits | do | 19 |
| Benzol | do | 3 |
| Oil of tansy | c. c. | 3 |

This pitch paint was used in place of the usual pitch finish. The desirable features of the pitch paint is that since it is made and applied at room temperature, any repellents which are added will retain unchanged their properties such as taste and particularly smell, much better and more completely than if added to hot pitch.

Oil of tansy has been incorporated by applicant into the folded paper wrap during the folding operation. It has also been used to saturate the valley filler or rip cord and the outer fabric braid. One such saturating composition may be made up as follows:

| Oil of tansy | c. c. | 200 |
|---|---|---|
| Transformer oil | quarts | 2.25 |
| Paraffin | pounds | 0.5 |
| Textile spirits | quarts | 1 |

The other materials of this group may be incorporated in similar manner.

The preferred materials in the first group, namely, maleic acid and alpha-naphthol, are relatively inexpensive. They are commercial chemicals which are widely used in the dye industry and are produced in quantity in this country at a standard price. Hence they are not subject to monopoly or shortage. They are permanent rodent repellents. They are highly effective as repellents, though perhaps not quite so effective as the materials of the aromatic oil group in which smell is more dominant. They are also unobjectionable, either from the standpoint of odor or health, to the operators handling the materials.

The materials of the aromatic oil group, in which smell is more dominant, are considerably more expensive than either maleic acid or alpha-naphthol, but as they may be used in much smaller amounts, or used with the other materials, their cost is not seriously objectionable. They are somewhat less permanent, but when used in a protected location in the cable are good for the expected life of the cable. In any event, they are highly effective for a long period of time after the cables have been installed. During this time the rats will have established their runs to avoid the cables and thereafter are not likely to change them and attack the cable. The materials of this group are manufactured in this country for use as drugs, perfumes and flavors. The supply of basic materials is plentiful and if the demand increases the price undoubtedly will decrease. They are not objectionable to handle in the plant.

Maleic acid is a white powder soluble in water, alcohol, acetone and glacial acetic acid and therefore is readily incorporated in either a lacquer or a size solution. It is not miscible with paraffin, but can be mixed with it, though this is not recommended due to the fact that on prolonged heating maleic acid changes into its stereo-isomer fumaric acid which has just a plain acidulous taste. Maleic acid has a repulsive, nauseous and astringent taste and a faint acidulous odor which appears to be very objectionable to rats. It melts at 130° C.

Alpha-naphthol has a disagreeable burning taste. It is readily soluble in alcohol, benzol, chloroform, and ether, and to some extent in hot water. These properties make it readily applicable with lacquers and also in a paraffin finish. When it is added to an aqueous starch size it is in suspension and for this reason the liquid is kept in agitation. It may be mixed directly with the mica; but it is not recommended that it be added directly to the finishing wax because this must be treated at 205-232° C. and at this temperature the alpha-naphthol, which melts at 97° C., has an appreciable vapor pressure which leads to excessive losses. In addition to its repellent properties, alpha-naphthol has antiseptic and anti-fermenting properties which increase its desirability for use in cables.

Oil of tansy has a characteristic aromatic and ethereal odor and a peculiarly bitter taste. Its active principle is believed to be thujone. Its odor, though very noticeable, is not objectionable to humans, but appears to be very objectionable to rats. It may be used in a lacquer, or to saturate the braid which may then be coated with a lacquer of the same or another oil.

The synthetic, imitation, or artificial oil of tansy seems to have about the same properties and to be about as effective as the natural oil and, in addition, is less expensive.

Oil of wormwood has an odor similar to oil of tansy, but is more pungent. It appears to contain a high percentage of thujone and thujyl alcohol.

A pitch paint made of oil of tansy and maleic acid was found to combine the good properties of both. It proved very effective when used in place of a finishing wax.

An effective combination was found in saturating the crinkled paper dam with oil of tansy and applying maleic acid (6%) in the starch size.

I have found that oil of tansy is effective when as little as 1% is used and maleic acid is effective when as little as 6% is used.

When using maleic acid and alpha-naphthol, they may both be mixed together with the mica and then an alpha-naphthol-maleic-acid size used over all. Addition of alpha-naphthol to the inside of the cable by treating the filler cord further increases the repellent properties. In a lacquer 15% of either is recommended. In the mica 3-5% of each of maleic acid and alpha-naphthol are suggested. When added to the size 10-15% maleic acid and at least 5% of alpha-naphthol is recommended. When applied to the filler cord a saturated solution in alcohol is suggested as a saturant.

If a mixture consisting of oil of tansy and maleic acid, or oil of tansy and alpha-naphthol, or a combination of all of these materials is to be used, then the most desirable method of application would be by the use of a substance which would act as a mutual solvent for all of the constituent materials. Alcohol is such a mutual solvent and it has been so used successfully. Using these repellents in form of a solution facilitates the penetration of these materials into the fibrous parts of the cable.

With any of the above combinations, one or more of the aromatic oils may be added.

Cables made in accordance with the present invention have given very satisfactory results in extensive tests.

While the invention has been described in some detail for illustrative purposes, it is to be understood that it may have various embodiments within the limits of the prior art and the scope of the subjoined claims.

I claim:

1. An electrical conductor including a non-metallic covering therefor having incorporated therein an unpalatable rodent repellent substance including a mixture of alpha-naphthol, maleic acid and oil of tansy which is stable at the maximum operating temperature of the conductor, which has pronounced smell characteristics, and which is prepared and applied to the conductor in the cold state.

2. An electrical conductor including a non-metallic covering therefor having incorporated therein an unpalatable rodent repellent substance containing oil of tansy which is stable at the maximum operating temperature of the conductor but is subject to deterioration at temperatures substantially above the maximum operating temperature of the conductor, which has pronounced smell characteristics, and which is prepared and applied to the conductor in the cold state.

3. An electrical conductor including a non-metallic covering therefor having incorporated therein an unpalatable rodent repellent substance containing thujone which is prepared and applied as a cold penetrating coating.

4. An electrical conductor including a non-metallic covering therefor having incorporated therein an unpalatable rodent repellent substance having pronounced smell characteristics selected from the group consisting of maleic acid and alpha-naphthol and mixed with a substance selected from the group consisting of oil of tansy, oil of wormwood and oil of thuja.

5. An electrical conductor including a non-metallic covering therefor having incorporated therein an unpalatable rodent repellent substance including a mixture of alpha-naphthol, maleic acid and oil of tansy having the characteristics of a taste which is burning, irritating, astringent, or nauseating and a smell which is aromatic, ethereal, or pungent, and which is applied in a cold state to the interior of the cable.

6. An electrical conductor including a non-metallic covering therefor having incorporated therein an unpalatable rodent repellent substance selected from the group consisting of maleic acid and alpha-naphthol combined with a substance selected from the group consisting of oil of tansy, oil of wormwood and oil of thuja dissolved in a mutual solvent.

7. An electrical conductor including a non-metallic covering therefor having incorporated therein an unpalatable rodent repellent substance comprising maleic acid and alpha-naphthol.

8. An electrical conductor including a non-metallic covering therefor having incorporated therein an unpalatable rodent repellent substance comprising maleic acid.

9. An electrical conductor including a non-metallic covering therefor having incorporated therein an unpalatable rodent repellent substance comprising alpha-naphthol.

10. An electrical conductor including a non-metallic covering therefor having incorporated therein an unpalatable rodent repellent substance comprising a thujone component.

11. An electrical conductor including a non-metallic covering therefor having incorporated therein an unpalatable rodent repellent substance comprising oil of tansy.

12. An electrical conductor including a non-metallic covering therefor having incorporated therein tansy oil as an unpalatable rodent repellent substance which is stable at the maximum operating temperature of the conductor but is subject to deterioration at temperatures substantially above the maximum operating temperature of the conductor, and a non-metallic protective covering to reduce dissipation of the rodent repellent substance incorporated interiorly of the conductor construction.

13. An electrical conductor including a non-metallic covering therefor having incorporated therein tansy oil as an unpalatable rodent repellent substance having a smell which is aromatic, ethereal, or pungent, and an overlying non-metallic protective covering having incorporated therein a mixture of alpha-naphthol and maleic acid as an unpalatable rodent repellent substance having a taste which is burning, irritating, astringent or nauseating.

GUSTAV W. PIRK.